US012539185B2

United States Patent
Grüner et al.

(10) Patent No.: US 12,539,185 B2
(45) Date of Patent: *Feb. 3, 2026

(54) SURGICAL INSTRUMENT AND STEERING GEAR FOR SAME

(71) Applicant: KARL STORZ SE & CO. KG, Tuttlingen (DE)

(72) Inventors: Sven Axel Grüner, Trossingen (DE); Dominik Längle, Mülheim (DE); Janosz Schneider, Donaueschingen (DE); Jochen Stefan, Wald (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 200 days.

This patent is subject to a terminal disclaimer.

(21) Appl. No.: 18/290,942

(22) PCT Filed: Jul. 25, 2022

(86) PCT No.: PCT/EP2022/070808
§ 371 (c)(1),
(2) Date: Jan. 22, 2024

(87) PCT Pub. No.: WO2023/006672
PCT Pub. Date: Feb. 2, 2023

(65) Prior Publication Data
US 2024/0423738 A1 Dec. 26, 2024

(30) Foreign Application Priority Data
Jul. 28, 2021 (DE) .................... 10 2021 119 519.5

(51) Int. Cl.
*A61B 17/29* (2006.01)
*A61B 34/00* (2016.01)
(Continued)

(52) U.S. Cl.
CPC .............. *A61B 34/71* (2016.02); *A61B 17/29* (2013.01); *B25J 9/1035* (2013.01); *A61B 2017/00398* (2013.01); *A61B 2017/2903* (2013.01)

(58) Field of Classification Search
CPC ..... A61B 17/00; A61B 17/29; A61B 17/2909; A61B 2017/00398; A61B 2017/2903;
(Continued)

(56) References Cited

U.S. PATENT DOCUMENTS 5,454,827 A    10/1995   Aust et al.
5,649,956 A *   7/1997   Jensen ..................... B25J 18/04
                                                                    606/1
(Continued)

FOREIGN PATENT DOCUMENTS

DE     102019121092 A1    2/2021

OTHER PUBLICATIONS

International Search Report, Application No. PCT/EP2022/070808, mailed Oct. 26, 2022. ISA/European Patent Office.
(Continued)

*Primary Examiner* — Vi X Nguyen
(74) *Attorney, Agent, or Firm* — Honigman LLP

(57) ABSTRACT

A steering gear for a surgical instrument includes an angling mechanism which can be controlled by a spatially adjustable wobble plate. The steering gear has a first and a second drive wheel with a respective associated motor, and the second drive wheel is arranged offset by 180° relative to the first drive wheel on an axis of rotation in common with the first drive wheel and perpendicular to the longitudinal axis. The wobble plate is mounted between the first drive wheel and the second drive wheel in a steering ring. A retaining bracket rotatably about the common axis of rotation of the drive wheels, wherein the steering ring is mounted in the retaining
(Continued)

bracket an rotatable about the axis of rotation of the third gear wheel, such that the engagement between the third gear wheel and the drive wheels is secured.

15 Claims, 12 Drawing Sheets

(51) Int. Cl.
 *B25J 9/10* (2006.01)
 *A61B 17/00* (2006.01)
(58) Field of Classification Search
 CPC ... A61B 2017/292; A61B 34/00; A61B 34/71; B25J 9/10
 See application file for complete search history.

(56) References Cited

U.S. PATENT DOCUMENTS

| | | | |
|---|---|---|---|
| 6,331,181 B1 * | 12/2001 | Tierney | G16H 40/63 |
| | | | 606/130 |
| 7,699,855 B2 | 4/2010 | Anderson et al. | |
| 2010/0228284 A1 | 9/2010 | Cooper et al. | |
| 2014/0257333 A1 * | 9/2014 | Blumenkranz | A61B 17/2909 |
| | | | 606/130 |

OTHER PUBLICATIONS

International Preliminary Report on Patentability, Application No. PCT/EP2022/070808, dated Jan. 18, 2024.

* cited by examiner

Prior art

SURGICAL INSTRUMENT AND STEERING GEAR FOR SAME

CROSS-REFERENCE TO RELATED APPLICATIONS

This application is the U.S. national stage of PCT/EP2022/070808 filed on Jul. 25, 2022, which claims priority of German Patent Application 10 2021 119 519.5 filed on Jul. 28, 2021, the contents of which are incorporated herein.

TECHNICAL FIELD

The disclosure relates to a steering gear of a surgical instrument for deflecting a tool tip by means of a spatially orientable wobble plate, and to a surgical instrument which comprises such a steering gear.

BACKGROUND

From the prior art, surgical instruments are known which can be guided manually or by a robot and which have tools whose tool tip can be pivoted by means of a plurality of pivot members engaging in one another. These pivot members are connected to a multiplicity of steering wires or steering cables in order to achieve delicate control of the tool tip. A more uniform force distribution in all deflection directions can be obtained by way of a plurality of thin steering wires in comparison with a few thicker steering wires.

It is known from U.S. Pat. No. 5,454,827 B2 to couple such steering wires to a spatially adjustable plate arranged proximally in a manipulation unit, which plate is connected via a rod to a manually manipulable control lever, such that a movement of the spatially adjustable wobble plate causes a corresponding relative movement of the distal-side pivot members and thus a pivoting of the tool tip.

The design of the drive for the steering wires with the spatially adjustable wobble plate, on which all four steering wires are mounted, is advantageous in that this enables a spatially compact structure and only requires the movement of one component in order to be able to address all the steering wires. This structure means that it is possible to use just a small number of steering wires and that the spatially adjustable plate, which serves as the drive for the steering wires, can be manually manipulated, both of which affect the sensitivity and reproducibility of the adjustment of the distal-side pivot members.

U.S. Pat. No. 7,699,855 B2 discloses a surgical instrument which has an interface so as to be able to connect the instrument to a robot arm. All the drives that control the instrument are arranged in the robot arm here. The transfer of the rotary angles from drives to the instrument is implemented by way of coupling plates in a common separation plane.

DE 10 2019 121 092 A1 further discloses, in a surgical instrument with a compact steering gear, the transfer of the adjustment angles of two drives directly to the wobble plate in order to orient the latter for controlling the tool tip. For this purpose, steering wires are fastened to the wobble plate so that the tool tip can be steplessly and smoothly controlled by alignment of the wobble plate. For this purpose, the known steering gear has two drive bevel gears which are offset by 180° from one another, arranged on a common axis of rotation, which runs perpendicular to an instrument longitudinal axis, and each with an associated motor. The wobble plate is arranged between the drive bevel gears and is mounted in a steering ring which is connected for conjoint rotation to a third bevel gear which engages with the two drive bevel gears and is rotatable about an axis of rotation running perpendicular to the instrument longitudinal axis and perpendicular to the common axis of rotation of the drive bevel gears. The gear chain is supplemented by a fourth bevel gear, which is arranged on the axis of rotation of the third bevel gear, offset by 180° from the third bevel gear, and is in engagement with the two drive bevel gears, wherein the steering ring is mounted freely rotatably in the fourth bevel gear. The toothing ring, closed in this way, ensures that all the bevel gears engage with one another and permits a uniformly circumferential force distribution.

SUMMARY

It is an object of the present disclosure to provide alternative guidance of the steering ring while ensuring that the drive bevel gears engage with the bevel gear of the steering ring.

This object is achieved by a steering gear having the features of claim 1.

The further object of making available a surgical instrument with alternative guidance of the steering ring is achieved by the surgical instrument having the features of independent claim 14.

Developments of the steering gear and of the surgical instrument are set forth in the respective dependent claims.

A first embodiment of the steering gear according to the disclosure is provided and designed for a surgical instrument. It is arranged at the proximal end of a shaft which defines a longitudinal axis B and comprises at the distal end a deflection mechanism, which is controllable by a spatially alignable wobble plate. The steering gear according to the disclosure comprises a first drive wheel and a second drive wheel, each with an assigned motor, wherein the second drive wheel is arranged offset by 180° from the first drive wheel on an axis of rotation A common with the first drive wheel and running perpendicular, which is to say at right angles, to the longitudinal axis. In this case, the wobble plate is mounted between the first drive wheel and the second drive wheel in a steering ring connected to a third gear wheel for conjoint rotation therewith, said third gear wheel meshing with the first drive wheel and the second drive wheel and being rotatable about an axis of rotation C which runs perpendicular to the longitudinal axis B and the common axis of rotation A of the drive wheels. Advantageously, the steering gear comprises a support yoke which is rotatably mounted about the common axis of rotation of the drive wheels, wherein the steering ring is moreover mounted in the support yoke in a manner rotatable about the axis of rotation of the third gear wheel such that, as a result of mounting the steering ring in the support yoke mounted on the common axis of rotation of the drive wheels, the meshing of the third gear wheel, which is connected to the steering ring, with the drive wheels is ensured. Thus, it is advantageously possible to dispense with a fourth gear wheel.

This creates a steering gear which requires advantageously little installation space.

According to an embodiment of the steering gear according to the disclosure, the support yoke can have a u-shaped embodiment with a base and two limbs. Hence, its geometry is advantageous in respect of space take up and stability.

The base of the support yoke can have a receptacle opening in which a steering ring connector formed on the steering ring is rotatably mounted. Further, each limb can have a bearing eye by means of which the support yoke is mounted in a manner rotatable about the common axis of rotation of the drive wheels. For example, the support yoke can be mounted on a respective journal of the drive wheels, which is coupled to a drive shaft of the respective motor. The drive wheels can also be coupled to a drive shaft without a journal, with the result that the support yoke may be arranged on an axial portion of the respective drive shaft. Alternatively, if the drive wheels are not driven directly by a drive shaft but instead are rotatably arranged on a bearing axis, the support yoke can be rotatably arranged on an axial portion of the respective bearing axis of the drive wheels.

According to a further embodiment of the steering gear according to the disclosure, the steering ring connector can have a cylindrical shape and be mounted by way of a steering ring bearing in a cylindrical portion of the receptacle opening.

Also, according to a further embodiment of the steering gear according to the disclosure, provision can be made for the third gear wheel to be present on the steering ring diametrically to the base of the support yoke. In order to ensure here the engagement of the third gear wheel with the drive wheels, a further embodiment of the steering gear according to the disclosure provides for a fastening element which provides an operative connection between the support yoke and the steering ring and which is designed to pull the steering ring in the direction of the base of the support yoke and thereby pull the third gear wheel connected to the steering ring into engagement with the drive wheels. This can take all play out of the engagement between the third gear wheel and the drive wheels.

The fastening element for providing the operative connection between the support yoke arranged diametrically to the third gear wheel and the steering ring can be a screw which is screwed into the steering ring connector in the axis of rotation of the third gear wheel and thus axially fixes the steering ring bearing and the steering ring.

According to an alternative, very advantageous embodiment, the third gear wheel and the base of the support yoke are present on the same side of the steering ring, with the result that the engagement of the third gear wheel with the drive wheels is ensured by virtue of the base of the support yoke pressing on the steering ring. Advantageously, on the one hand, an additional fastening element can be dispensed with here and, on the other hand, a more compact structure is achieved as a result of the one-sided arrangement of support yoke base and third gear wheel on the steering ring, or installation space on the other side of the steering ring becomes free and can be used for example to house other components of the steering gear.

Further embodiments of a steering gear according to the disclosure relate to the fact that the steering ring can be formed in one piece with the third gear wheel and/or that the drive wheels each comprise at least one bevel gear rim portion for meshing with at least one bevel gear rim portion of the third gear wheel. In this case, the bevel gear rim portions of the drive wheels and the bevel gear rim portion of the third gear wheel can be formed as bevel gear rims over the entire circumference, or preferably—in particular in the embodiment with the one-sided arrangement of support yoke base and third gear wheel-extend over a first pre-determinable circumferential portion of the respective drive wheel and over pre-determinable circumferential portions of the third gear wheel, which provide the meshing of the drive wheels with the third gear wheel over a pre-determinable range of motion of the steering ring.

Since the steering ring does not experience a full rotation for the intended deflection of a wobble plate in a surgical instrument but is only pivoted through a fraction of a whole revolution, for example in a range from 30° to 60°, for example 45°, in all spatial directions, only a corresponding portion of the teeth of an all-round gear rim of the drive wheels only ever also meshes with the third gear wheel. Thus, it is possible to dispense with the segment on the circumference of the drive wheels thereby not used for meshing with the third gear wheel. Accordingly, it is also possible that the third gear wheel only comprises the gear rim portions required in each case for meshing with the drive wheels rather than an all-round gear rim.

Reducing the bevel gear rim to the bevel gear rim portion required for meshing in each case is especially advantageous in the embodiment in which installation space becomes free on the other side of the steering ring as a result of arranging the third gear wheel on the same side as the base of the support yoke. Dispensing with the superfluous toothing additionally makes installation space available which can be used to house further components, for example a gearing for transferring the adjustment movements of a motor to a drive wheel.

Thus, although an embodiment of the steering gear according to the disclosure provides for each drive wheel to be actuatable directly by the assigned motor by way of a respective drive shaft, the drive axis of which corresponds to the common axis of rotation of the two drive wheels, alternative embodiments thereto relate for this purpose to the fact that each drive wheel is actuatable by the assigned motor by way of a respective drive shaft and a respective gearing, wherein the drive axes of the drive shafts can preferably also run parallel or perpendicular to the common axis of rotation of the two drive wheels, with the result that space-saving housing of the motors, for example closer to the longitudinal axis, is made possible.

Embodiments of a steering gear according to the disclosure in this case also comprise a pinion or a worm shaft or a drive bevel wheel as gearing, wherein the drive wheels in each case comprise at least one corresponding drive rim portion for meshing with the respective gearing. That is to say, a drive rim portion for meshing with a pinion as gearing is designed as a gear rim, wherein the drive axes of both drive shafts run parallel to the common axis of rotation of the two drive wheels.

If the gearing is a worm shaft, the drive rim portion is designed as worm gear rim portion for meshing with the respective worm shaft, wherein the drive axes of both drive shafts run perpendicular to the common axis of rotation of the two drive wheels. And in the case of a drive bevel gear as gearing, the at least one drive rim portion is designed as bevel gear rim portion for meshing with the respective drive bevel gear, wherein the drive axes of both drive shafts run perpendicular to the common axis of rotation of the two drive wheels.

To form the drive wheels with the bevel gear rim (portion) for meshing with the third gear wheel and with the drive rim portions for meshing with a respective gearing, the drive wheels in one embodiment of the steering gear according to the disclosure can be designed as double wheels, wherein the respective bevel gear rim portion is arranged axially adjacent to the drive rim portion and the bevel gear rim portions of the two double wheels face one another for the purpose of meshing with the third gear wheel.

An alternative embodiment thereto, in which the bevel gear rim portion extends only over the first circumferential portion of the respective drive wheel required for meshing with the third gear wheel, provides for the respective drive rim portion for meshing with the respective gearing (pinion, worm shaft, drive bevel gear) in a pre-determinable range of motion of the steering ring to extend over a second pre-determinable circumferential portion of the respective drive wheel, said circumferential portion having no overlap with the respective bevel gear rim portion.

An alternative gearing of a further embodiment of a steering gear according to the disclosure is a toothed rack gearing comprising a drive pinion, a toothed rack having an end toothing and having a lateral toothing, and a transmission pinion. In this case, the drive pinion is actuatable by the respectively assigned motor by way of the drive shaft and meshes with the lateral toothing of the toothed rack. The transmission pinion meshes with the end toothing of the toothed rack and is connected via an output shaft to the drive wheel, wherein the drive axes run perpendicular to the common of the two drive wheels.

According to a further alternative embodiment of a steering gear according to the disclosure, the gearing can comprise a spindle or pulley and a traction mechanism, wherein the drive wheels are designed as double wheels, in which the drive rim is designed as traction mechanism plate or pulley. The traction mechanism establishes an operative connection between the spindle or pulley, arranged on the drive shaft, and the drive rim designed as traction mechanism plate or pulley. In this case, the drive axes of the gearing with spindle can run in any desired orientation in relation to the common axis of rotation on account of the possibility of traction mechanism diversion, while the drive axes of the gearing with pulley run parallel to the common axis of rotation of the two drive wheels.

A first embodiment of a surgical instrument according to the disclosure comprising a shaft, a manipulation unit arranged at the proximal end of the shaft, and a tool arranged at the distal end of the shaft with a tool tip which is able to be deflected by means of a distal deflection mechanism and which is controllable by a wobble plate that can be spatially oriented by means of two drives refers to the fact that the surgical instrument comprises a steering gear according to the disclosure for the spatial orientation of the wobble plate.

In further embodiments of the surgical instrument according to the disclosure, provision can be made for the wobble plate to be gimbal-coupled to a main shaft running coaxially with a longitudinal axis of the shaft and/or for the manipulation element to be axially displaceably mounted in the shaft and to be operatively connected on the proximal side to the manipulation unit. Further, the distal deflection mechanism of the tool tip able to be deflected can consist of pivot members which are arranged at the distal end of the shaft and are connected to the wobble plate of the steering gear by way of steering wires running in the longitudinal direction of the shaft. Moreover, the steering wires can be detachably fastened in clamping fashion to the wobble plate, for example by means of a clamping connection. For example, alternative forms of fastening the steering wires to the wobble plate comprise welding or crimping. Further, a fan plate can be arranged on the main shaft on the distal side upstream of the spatially adjustable plate: it increases the radial distance of the steering wires from the longitudinal axis of the shaft, with the steering wires running approximately parallel to one another between the fan plate and the wobble plate. But even without fan plate, the radial distance of the steering wires from the longitudinal axis of the shaft is greater at the wobble plate than at the proximal end of the shaft if the steering wires extend directly from the proximal end of the shaft to the wobble plate, with the result that the steering wires run to the wobble plate at an angle deviating from 90°.

Further embodiments, and some of the advantages associated with these and with further embodiments, are made clear and more understandable by the following detailed description which makes reference to the attached figures. Objects or parts thereof which are substantially the same or similar may be provided with the same reference signs. The figures are merely schematic illustrations of embodiments of the disclosure. An exemplary embodiment of the disclosure is depicted in the drawings. The drawings, the description, and the claims contain numerous features in combination. A person skilled in the art will advantageously also consider the features on an individual basis and combine them to form further advantageous combinations.

DETAILED DESCRIPTION OF PREFERRED EMBODIMENTS

Figure 1:
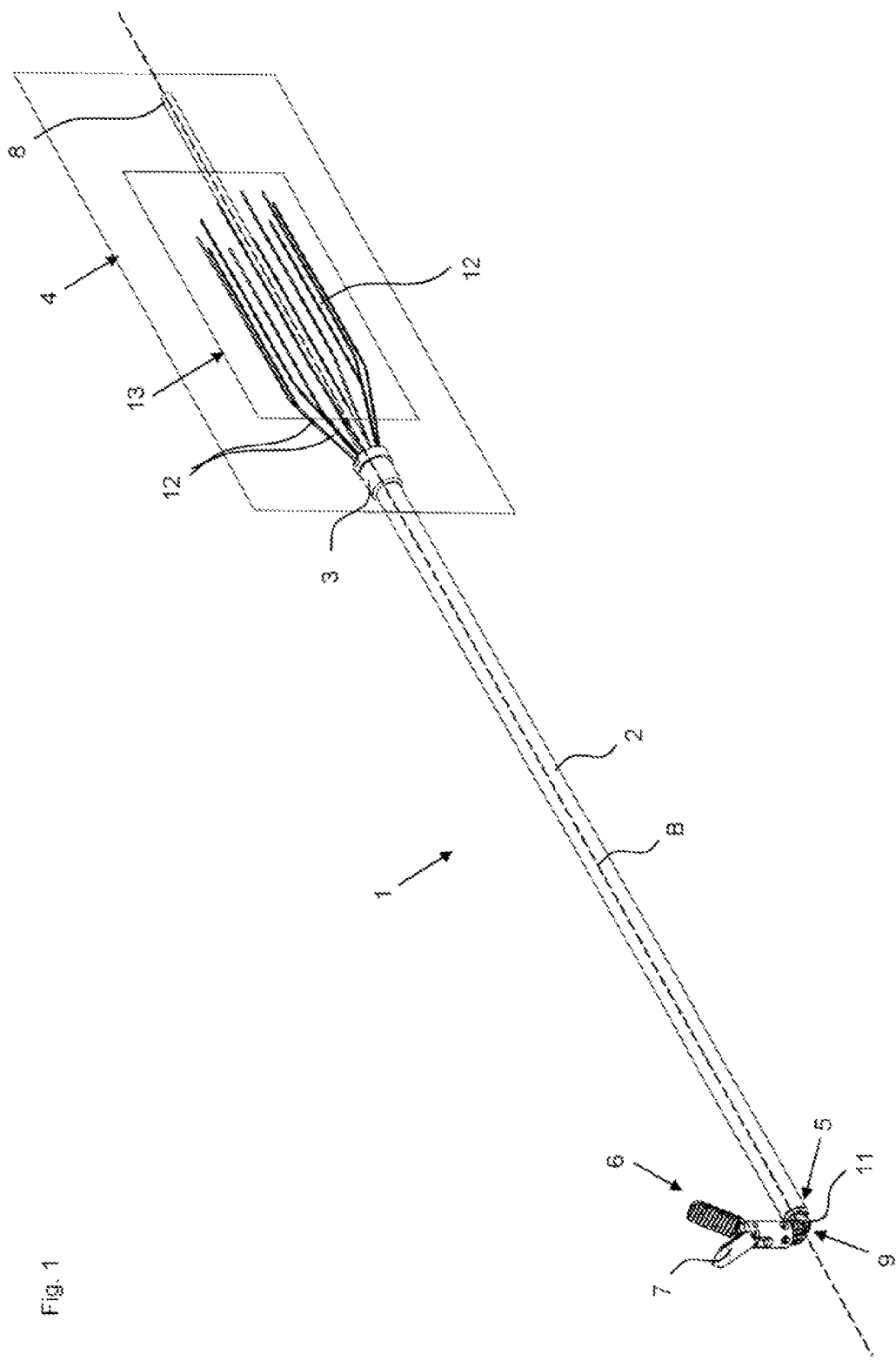
FIG. 1 shows a schematic perspective side view of a surgical instrument.

FIG. 1 schematically shows a surgical instrument 1 with a hollow shaft 2, a manipulation unit 4 (indicated only schematically) arranged at the proximal end 3 of the shaft 2, and a tool tip 6, arranged at the distal end 5 of the shaft 2, with a tool 7. The tool 7 can be manipulated via a manipulation element 8 which is axially displaceably mounted in the shaft 2 and which is operatively connected at the proximal side to the manipulation unit 4. The manipulation unit 4 can be a manually manipulable handle or else a structural unit designed for robotic use, which is to say also manipulable without manual intervention, which is advantageous for the reproducibility of the manipulation. The tool 7 of the tool tip 6 can be, for example, a tool provided with jaw parts, as depicted in FIG. 1, or else an endoscope, an applicator or the like. The tool tip 6 is pivotable relative to the longitudinal axis B of the shaft 2 by way of a hinge mechanism 9, wherein the hinge mechanism 9 consists of pivot members 11 which are arranged at the distal end of the shaft 5 and connected via steering wires 12 running in the longitudinal direction of the shaft 2 to a drive 13 arranged at the proximal end 3 of the shaft 2, in such a way that a movement of the proximal-side drive 13 causes a corresponding relative movement of the distal-side pivot members 11 and hence a pivoting of the tool tip 6. Even though exclusive use is made of the term steering wires 12 hereinabove and below, from a functional point of view use can also be made of steering cables, which is why the used term steering wires 12 should also be read and understood synonymously as steering cable.

The manipulation element 8, which is mounted axially displaceably in the shaft 2 and serves to manipulate the tool 7 for example consisting of two jaw parts, is in the form of a push/pull rod in the embodiments depicted. In the medical instrument 1 according to the disclosure, the drive 13 for the steering wires 12 can preferably be designed as a motorized drive 13, which comprises a spatially adjustable wobble plate 14 gimbal-coupled to a main shaft 21 running coaxially with the shaft 2 in order to displace the wobble plate 14 in three dimensions relative to the longitudinal axis B of the shaft 2. In this case, the steering wires 12 are mounted on, or fastened to, the wobble plate 14 (cf. FIGS. 11 and 13) such that a dis-placement of the wobble plate 14 brought about by the motorized drive 13 causes a pivoting of the tool tip 6 via the steering wires 12. The number of steering wires 12 to be used for a motorized drive 13 can be freely chosen. An optional fan plate 22 is used to lead the steering wires 12 running parallel to the longitudinal axis B of the shaft 2 to the wobble plate 14. To secure the steering wires 12 on the wobble plate 14, drilled through holes 23 are formed in the wobble plate 14 for each steering wire 12, the latter for example being able to be frictionally connected and fixed to the wobble plate 14 by way of setscrews introduced radially into the wobble plate or by way of a clamping plate arranged on the proximal side behind the wobble plate 14.

Figure 2:
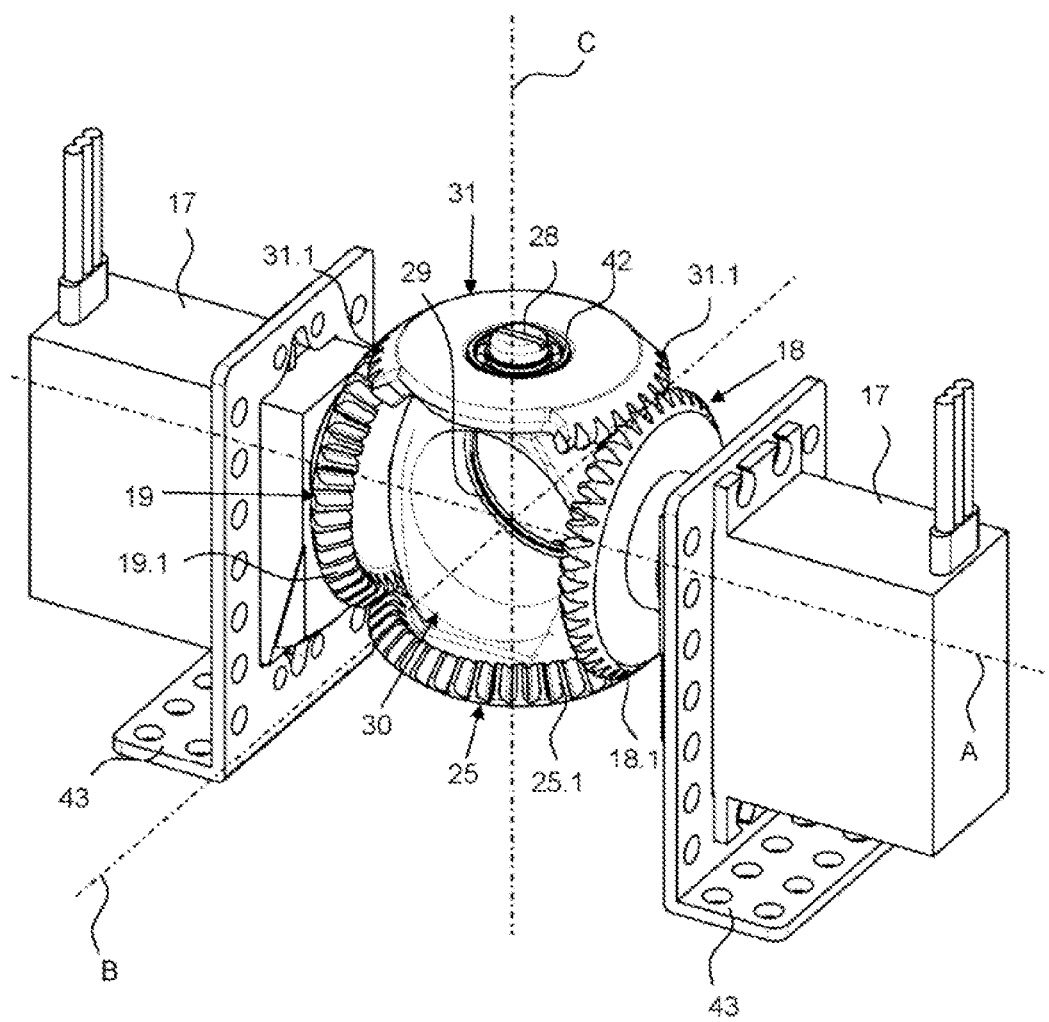
FIG. 2 shows a perspective detailed view of a motorized drive with a wobble plate steering gear from the prior art.

A motorized drive known from the prior art is depicted in FIG. 2, wherein the wobble plate not depicted therein is mounted in the steering ring 30 by way of a bearing ring 29 in order to enable a rotation of the wobble plate 14 with the main shaft 21 (cf. FIGS. 11 and 13) which extends along the longitudinal axis B of the shaft 2. In this case, the wobble plate mounted in the steering ring 30 is arranged between two drive wheels 18, 19 arranged offset by 180° from one another, said drive wheels being actuated by a respective motor 17 which is able to be mounted in the surgical instrument 1 by way of a holder 43. The drive shafts of the drive wheels 18, 19 are located on a common axis of rotation A, which is perpendicular to the longitudinal axis B of the shaft 2 not depicted in FIG. 2. The drive wheels 18, 19 are designed as bevel gears and each have a bevel gear rim 18.1, 19.1. The two drive wheels 18, 19 are coupled to a third gear wheel 25 which likewise is in the form of a bevel gear with a bevel gear rim 25.1 and which meshes with the two bevel gear rims 18.1, 19.1 of the drive wheels 18, 19, with the result that the axis of rotation C of the third gear wheel 25 intersects the common axis of rotation A of the drive wheels 18, 19 and the longitudinal axis B of the shaft 2. The third gear wheel 25 is connected to the steering ring 30 for conjoint rotation therewith such that, by way of the three meshing bevel gears 18, 19 and 25, each movement of the two drive wheels 18, 19 is transmitted directly to the wobble plate 14 coupled to the third gear wheel 25 via the steering ring 30, bringing about a direct manipulation of the steering wires 12. To secure the steering ring 30, a fourth gear wheel 31, as cover wheel as it were, is arranged opposite the third gear wheel 25 on the axis of rotation C of the third gear wheel 25, said fourth gear wheel likewise being designed as a bevel gear with two bevel gear rim portions 31.1, which mesh with the bevel gear rims 18.1, 19.1 of the two drive wheels 18 and 19. Thus, the gear chain formed by the drive wheels 18, 19 and gear wheel 25 is closed to form a closed toothing ring which ensures that all toothings remain in engagement, with the result that a uniformly all-round force distribution is ensured. All play can be taken from the gear chain of the four gear wheels 18, 19, 25, 31 by way of a screw 28, which draws the fourth gear wheel 31 to the steering ring 30. In this case, the steering ring 30 coupled for conjoint rotation with the third gear wheel 25 is freely rotatable in relation to the fourth gear wheel 31 as a result of mounting by means of the bearing ring 42, with the result that a rotation of the fourth gear wheel 31 about its axis of rotation C does not bring about a twist of the steering ring 30 and hence of the wobble plate.

Figure 3:
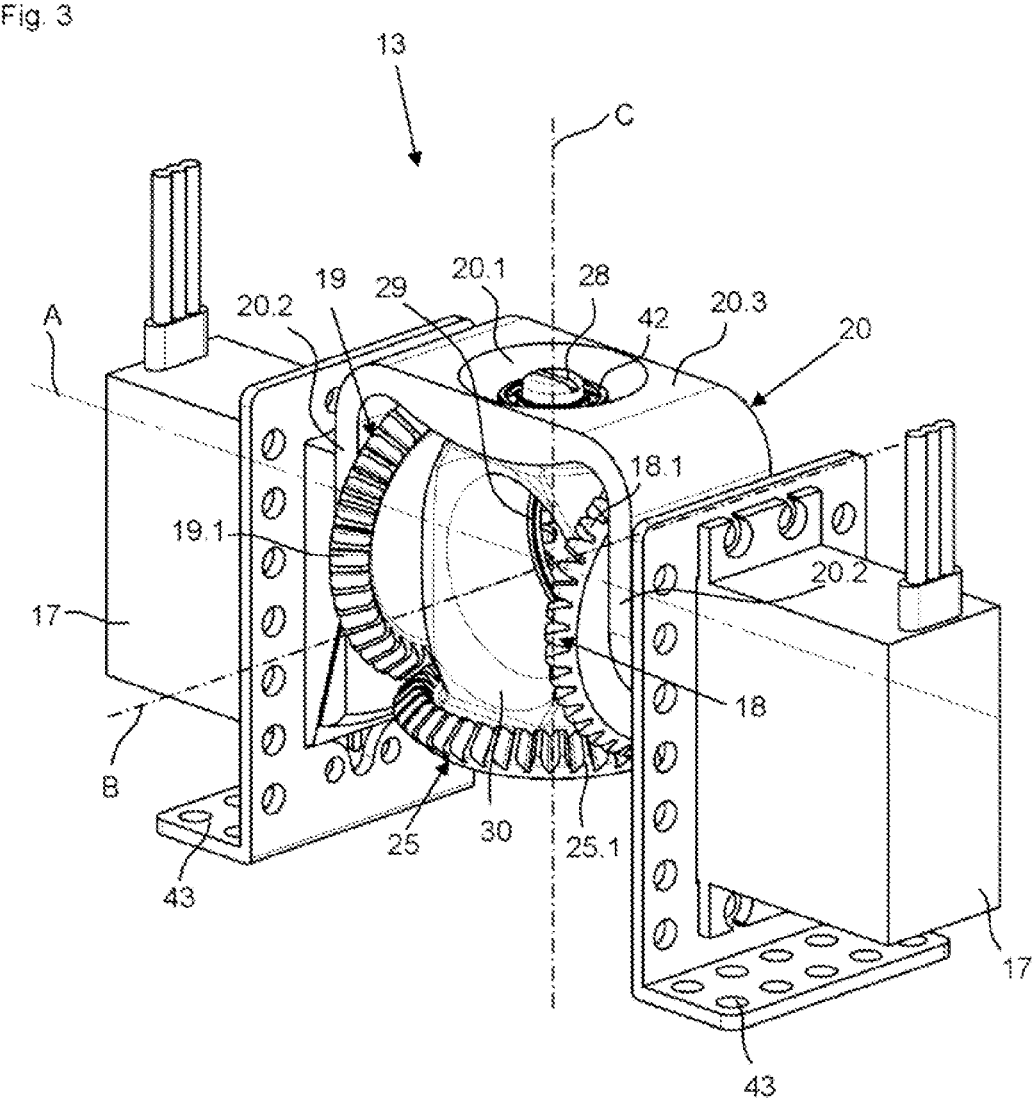
FIG. 3 shows a perspective detailed view of a motorized drive with a wobble plate steering gear as per an embodiment according to the invention.

FIG. 3 shows an example according to the disclosure for a steering gear 13 which differs from the motorized drive from the prior art according to FIG. 2 in that the fourth gear wheel 31 is dispensed with. To nevertheless ensure the engagement of the drive wheels 18, 19 with the third gear wheel 25 and the steering ring 30, the steering gear 13 according to the disclosure comprises a support yoke 20 as an engagement ensuring device formed in the example of FIGS. 3 to 6 by a support yoke 20 which is additionally schematically depicted in FIG. 7. The support yoke 20 has a u-shaped embodiment with two limbs 20.2 extending from a base 20.3. The embodiment shown in FIGS. 5 and 6 differs from the embodiment in FIGS. 3 and 4 by the arrangement of the third gear wheel 25: There, the base 20.3 of the support yoke 20 is diametric to the third gear wheel 25 in relation to the steering ring 30, while the base 20.3 of the support yoke 20 and the third gear wheel 25 are located on the same side of the steering ring 30 in FIGS. 5 and 6. In this case, the embodiment shown in FIGS. 5 and 6 is preferred as its structure saves more space vis-à-vis the prior art and it creates free installation space on one side of the steering ring 30—below the steering ring 30 in the illustration of FIGS. 5 and 6.

Figure 4:
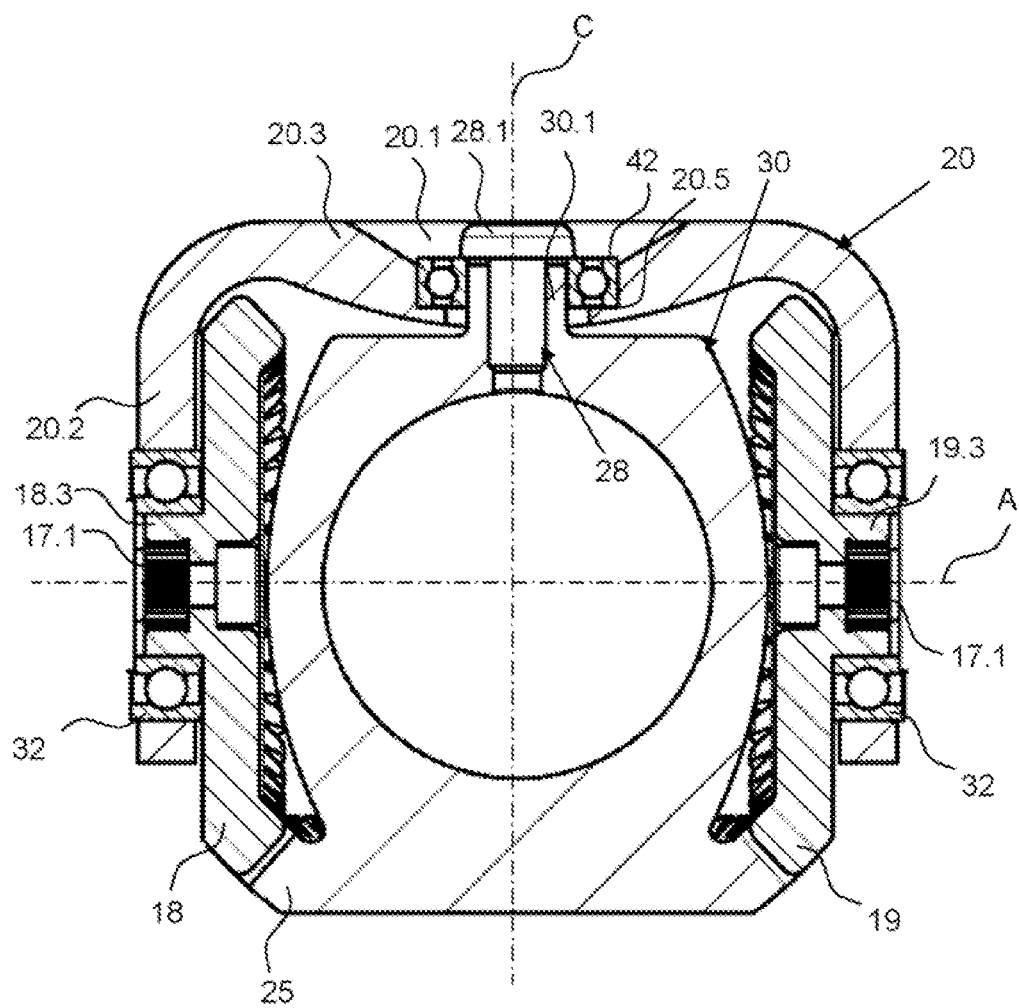
FIG. 4 shows a detailed lateral sectional view of the steering gear from FIG. 3.

In the example of FIGS. 3 to 6, the support yoke 20 is rotatably mounted on the journals 18.3, 19.3 of the drive wheels 18, 19 at the limbs 20.2 by way of appropriate bearings 32 accommodated in the bearing eyes 20.4, with the result that the third gear wheel 25 securely connected to the steering ring 30 constantly meshes with the drive wheels 18, 19. Naturally, in modifications deviating therefrom, the support yoke may be arranged on an axial portion of a drive shaft or bearing axis of the drive wheels that deviates from a journal. Provided in the base 20.3 is a receptacle opening 20.1 for rotatably mounting a steering ring connector 30.1, cylindrical in this case, of the steering ring 30 by means of a bearing ring 42 freely in relation to the support yoke 20. In the receptacle opening 20.1, said support yoke comprises a bearing seat 20.5 for the steering ring bearing 42, the alignment thereof depending on whether the third gear wheel 25 is arranged diametrically to the support yoke 20 or on the same side as the support yoke 20. If the support yoke 20 and third gear wheel 25 are arranged on the same side, as evident from FIG. 6, then the bearing seat 20.5 and the steering ring bearing 42 are formed or arranged around or in the receptacle opening 20.1 on a side of the base 20.3 facing the steering ring 30. If the support yoke 20 is arranged diametrically to the third gear wheel 25, which is depicted in FIG. 4, then the bearing seat 20.5 and hence the steering ring bearing 42 are formed or arranged around or in the receptacle opening 20.1 on a side of the base 20.3 facing away from the steering ring 30.

In the embodiment corresponding to FIG. 3, the steering ring 30 is pulled in the direction of the base 20.3 of the support yoke 20 by way of a fastening element 28 such as the depicted screw, with the result that the third gear wheel 25, which is connected to the steering ring 30, is likewise pulled upward in order to ensure an engagement with at least little play, when possible no play, of the gear wheel 25, which is formed as a bevel gear with a bevel gear rim 25.1, with the bevel gear rims 18.1, 19.1 of the drive wheels 18, 19. The head 28.1 of the screw 28 screwed into the steering ring connector 30.1 in this case simultaneously ensures the axial fixation of the steering ring bearing 42 and the steering ring 30 in relation to the axis of rotation C.

Figure 5:
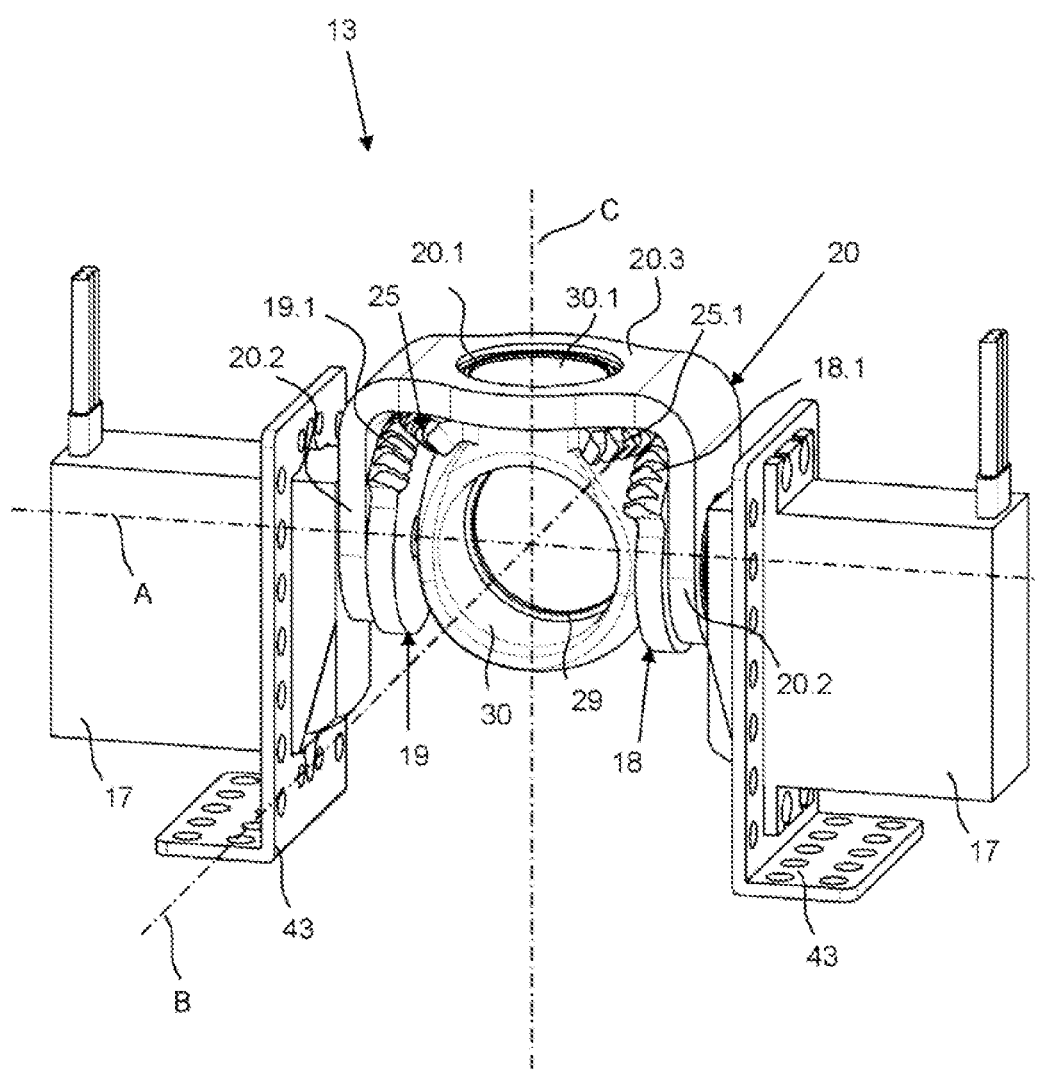
FIG. 5 shows a perspective detailed view of a motorized drive with a wobble plate steering gear as per a further embodiment according to the invention.
Figure 6:
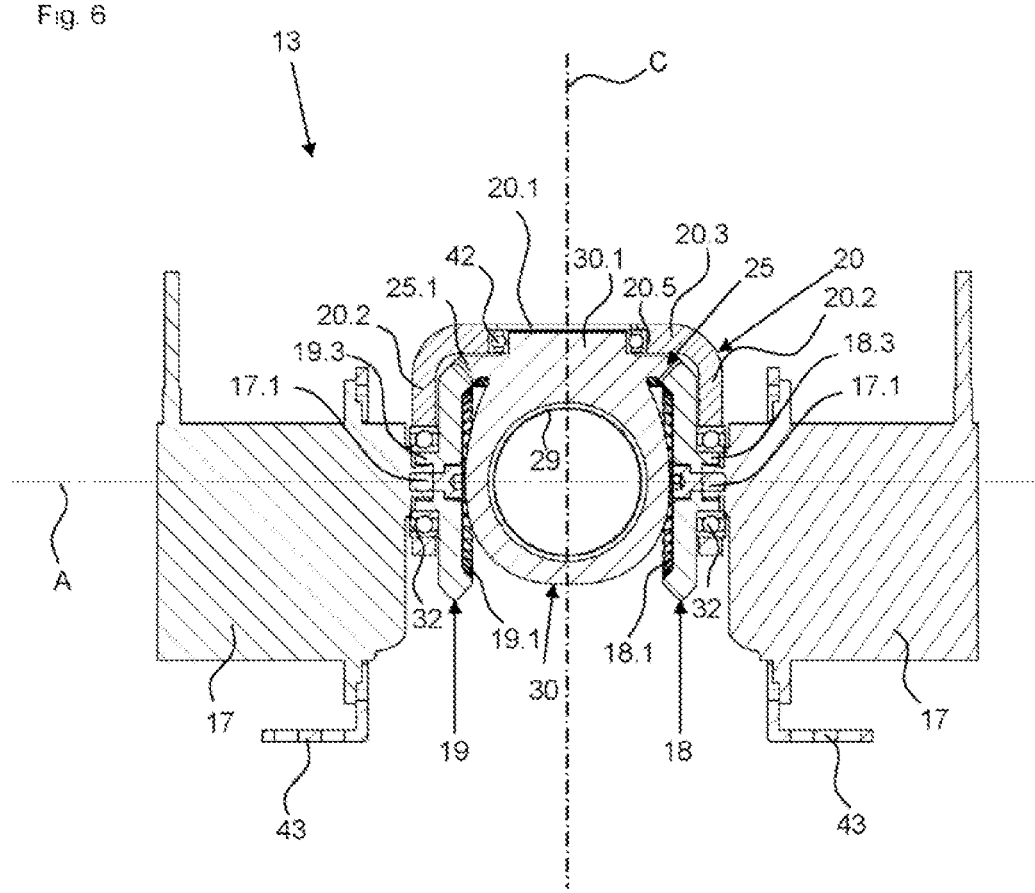
FIG. 6 shows a lateral sectional view of a motorized drive with a wobble plate steering gear as per a further embodiment according to the invention similar to FIG. 4 through a plane spanned by axes A and C.
Figure 7:
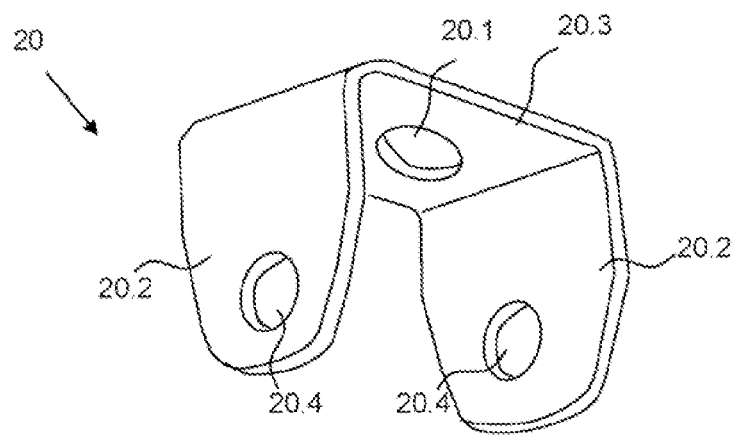
FIG. 7 shows a perspective view of a support yoke.

In the example of FIGS. 5 and 6, the third gear wheel 25, additionally formed in one piece with the steering ring 30 in this example, is also pressed against the drive wheels 18, 19 by the support yoke 20, which in this case is likewise mounted on the journals 18.3, 19.3 by way of the limbs 20.2, in order to ensure the engagement. Therefore, a fastening element such as a screw 28 can be dispensed with in this case, with the result that the steering ring connector 30.1 extends into the receptacle opening 20.1 of the support yoke 20 only for rotatable bearing by means of bearings 42. The example in FIGS. 5 and 6 also shows that, rather than an all-round bevel gear rim 18.1, 19.1 or bevel gear rim 25.1 as in FIG. 3, the drive wheels 18, 19 and the third gear wheel 25 are able to have only bevel gear rim portions 18.1, 19.1, and 25.1, respectively, in the portions required for meshing and for controlling the wobble plate. Accordingly, the drive wheels 18, 19 only still each have a bevel gear rim portion 18.1, 19.1 which extends along an arcuate portion required for a maximum deflection of the tool tip 6 of 90° for example. On account of the different pitch circles in the deflection at the tool tip and in the steering gear, the steering angle to be implemented in the latter can be significantly smaller than the deflection obtainable therewith at the tool tip. For example, a steering angle of only 30° in the steering gear may be sufficient to deflect the tool tip through 90°, which is why only a portion of the toothing ever meshes and the cutouts are possible. In accordance with the engagement with the drive wheels 18, 19, the third gear wheel 25 in each case has a corresponding bevel gear rim portion 25.1. As a result of dispensing with non-required teeth, the amount of space saved attained by the one-sided arrangement of the third gear wheel 25 and the support yoke 20 is increased even more.

The installation space obtained thus can be used in order to be able to arrange for example the motors 17, whose drive axes are located on the common axis of rotation A of the drive wheels 18, 19 in FIGS. 3 to 6, differently or in more space-saving fashion and be able to transmit the drive movements of the motors to the drive wheels 18, 19 using different gearings by virtue of the drive axes of the motors 17 being able to deviate from the common axis of rotation A and for example being able to be arranged perpendicular or parallel thereto, as elucidated in the examples below on the basis of FIGS. 8 to 13.

Figure 8:
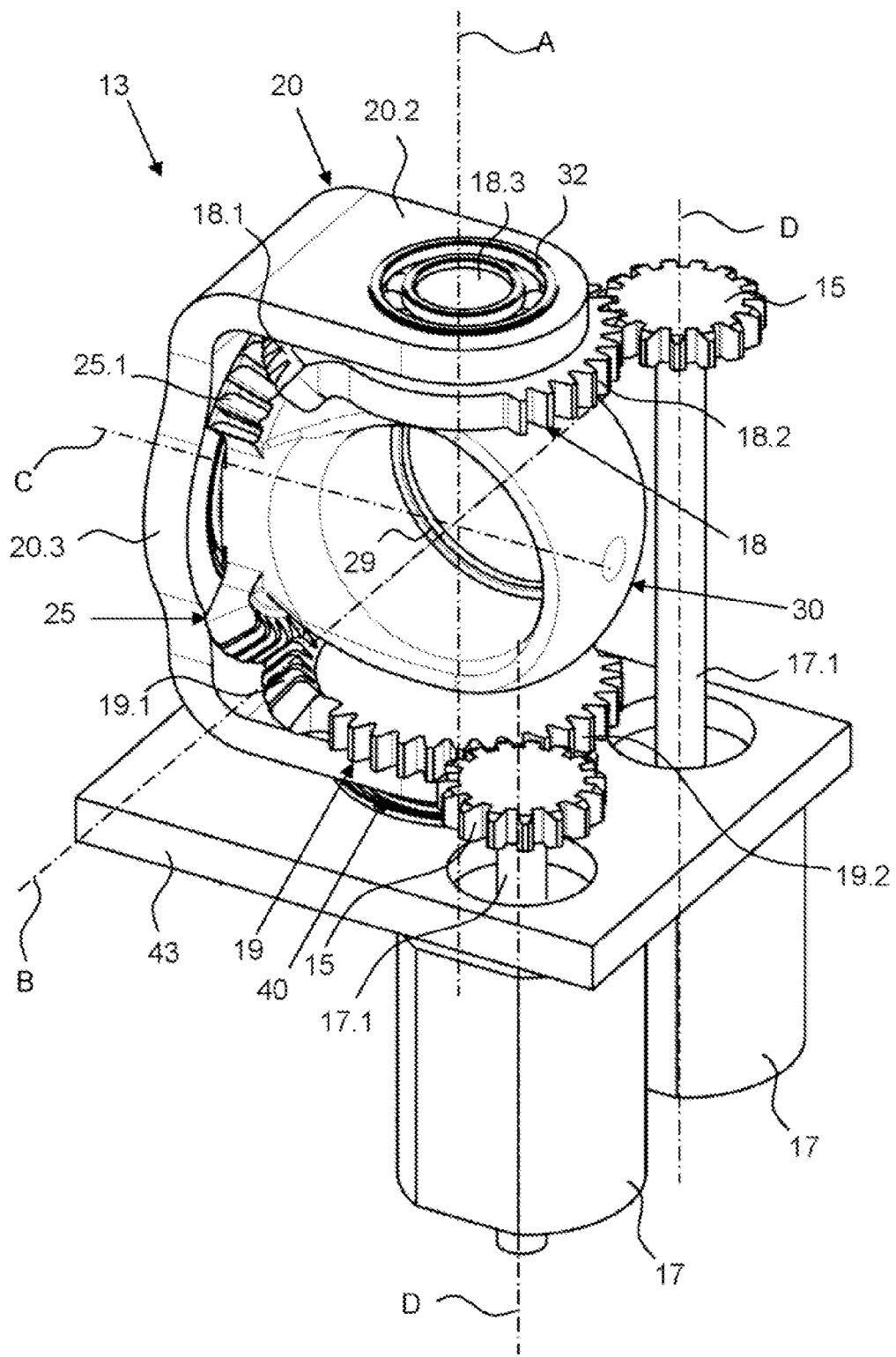
FIG. 8 shows a perspective detailed view of a motorized drive with a wobble plate steering gear as per a further embodiment according to the invention with a spur gear gearing.

FIG. 8 shows an example of a steering gear 13 according to the disclosure having a gearing for transmitting the adjustment movements of motors 17, arranged in parallel, to the drive wheels 18, 19. The support yoke 20 as engagement ensuring device is mounted at the limbs 20.2 on a respective journal 18.3, 19.3 by bearings 32 in the depicted illustration, each journal moreover being able to extend in a holder 43 for further mounting in a bearing 40 (indicated only on one side in FIG. 8). The schematic holder 43 depicted here is only exemplary and should in no way be construed as limiting. To transmit the adjustment movements of the two motors 17, arranged in this case on the other side of the holder 43, to the drive wheels 18, 19, a respective pinion 15 is provided, which is driven by the assigned motor 17 by way of a respective drive shaft 17.1 which extends through an opening in the holder 43. The parallel arrangement of the motors 17 next to one another in this case requires drive shafts 17.1 of different lengths in order to provide the engagement of the pinions 15 with the respective drive wheel 18, 19. The drive shafts 17.1 define the drive axes D which not only run parallel to one another but also parallel to the common axis of rotation A of the two drive wheels 18, 19. In this way, the drive axes D can be positioned relatively close to the longitudinal axis B. To mesh with the respective pinion 15, the drive wheels 18, 19 comprise a drive rim portion 18.2, 19.2 which extends on the circumference of the respective drive wheel 18, 19 over a portion required for the adjustment movements: this portion differs from the circumferential portion on which the respective bevel gear rim portion 18.1, 19.1 for meshing with the third gear wheel 25 is formed. This is possible on account of the pre-determinable restricted range of movement of steering ring 30 and wobble plate, which do not experience full rotations for angling the tool tip 6.

Since the examples of FIGS. 9 to 13 are intended to elucidate different gearings, the depiction of the support yoke as engagement securing device of the steering gear 13 according to the disclosure is dispensed with there for reasons of clarity. The supplement of a support yoke required to this end, corresponding to one of the examples from FIGS. 3 to 8, arises in an obvious manner.

Figure 9:
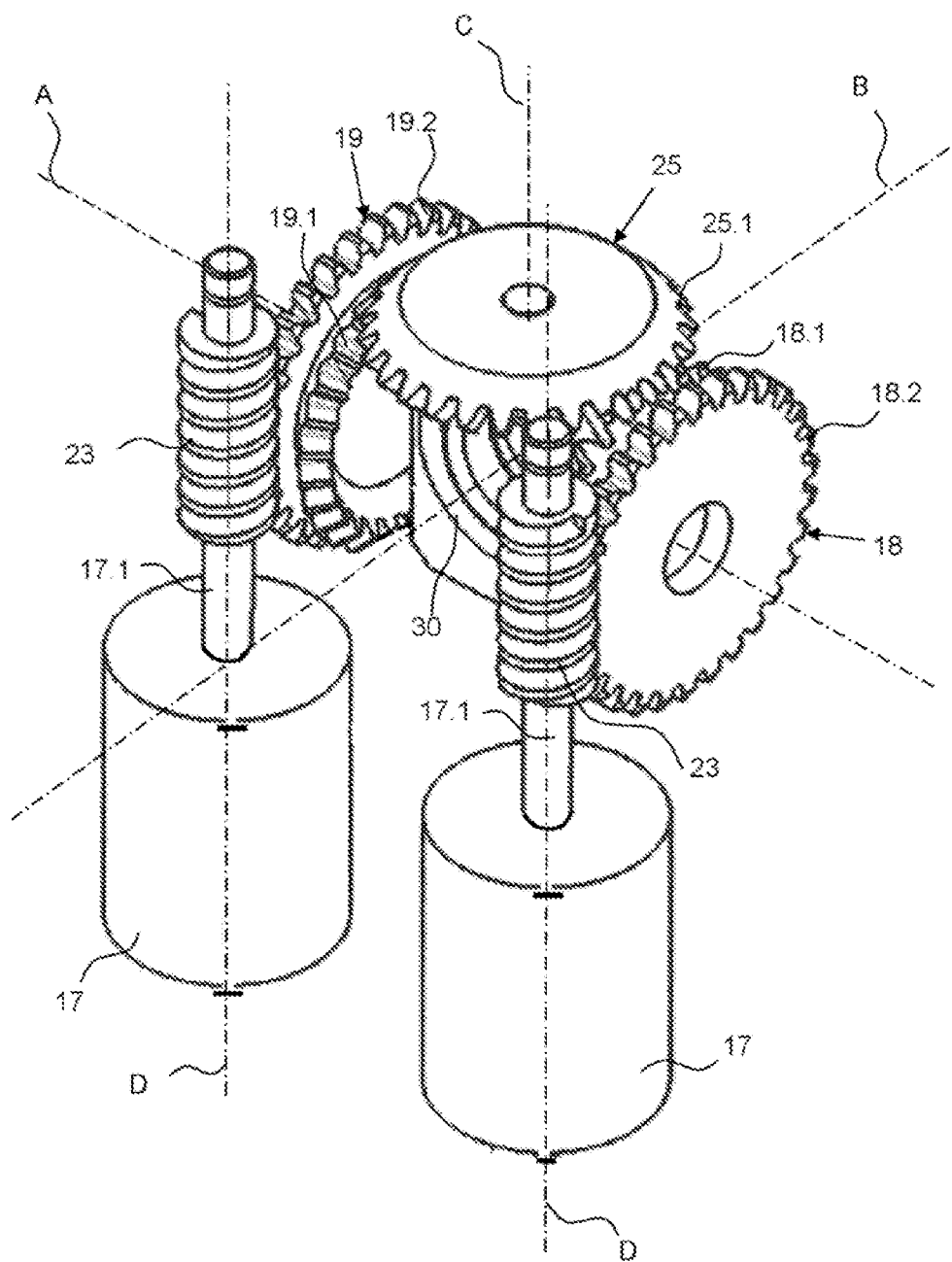
FIG. 9 shows a perspective detailed view of a motorized drive with a wobble plate steering gear as per a further embodiment according to the invention with a worm gear gearing.

The gearing of a steering gear according to the disclosure from FIG. 9 comprises a respective worm shaft 23 for transmitting the adjustment movements of the motors 17, arranged in parallel, to the drive wheels 18, 19: unlike in the example shown, the worm shaft may also be a multistart worm shaft. The worm shafts 23 extend on the drive shafts 17.1 along the respective drive axis D and mesh with a respective drive rim 18.2, 19.2, designed as a worm gear, of the drive wheels 18, 19 which are designed as double wheels in this example. To this end, the drive rims 18.2, 19.2 are arranged axially adjacent to the bevel gear rims 18.1, 19.1 which face one another for the purpose of meshing with the bevel gear rim 25.1 of the third gear wheel 25. The double wheels can be manufactured in one piece or may consist of a respective bevel gear connected to a worm gear. In the example shown, the drive axes D run not only perpendicular to the common axis of rotation A of the drive wheels but also perpendicular to the longitudinal axis B. However, it is obvious that the drive units made of motor 17, drive shaft 17.1, and worm shaft 23 can be arranged—also independently of one another—at any desired position of the circumference of the drive rims 18.2, 19.2 of the drive wheels 18, 19, with the result that the drive axes D, while always running perpendicular to the common axis of rotation A, may run as desired in relation to the longitudinal axis B, for example also parallel thereto.

Deviating from the examples depicted in FIGS. 8 and 9, a steering gear according to the disclosure may also comprise a gearing in which the pinions 15 like in FIG. 8 mesh with a drive rim 18.2, 19.2 of a drive wheel 18, 19 designed as a double wheel, like in FIG. 9. The embodiment with the double wheel then also allows here the arbitrary and independent arrangement of the drive units made of motor 17, drive shaft 17.1, and pinion 15 at any desired position along the circumference of the drive rims 18.2, 19.2 of the drive wheels 18, 19. Conversely, a gearing of a steering gear 13 according to the disclosure can likewise be formed by a worm shaft 23 like in FIG. 9 with a drive rim portion 18.2, 19.2 of a drive wheel 18, 19 like in FIG. 8, which also comprises a bevel rim portion 18.1, 19.1 that does not overlap with the drive rim portion 18.2, 19.2 along the circumference.

Figure 10:
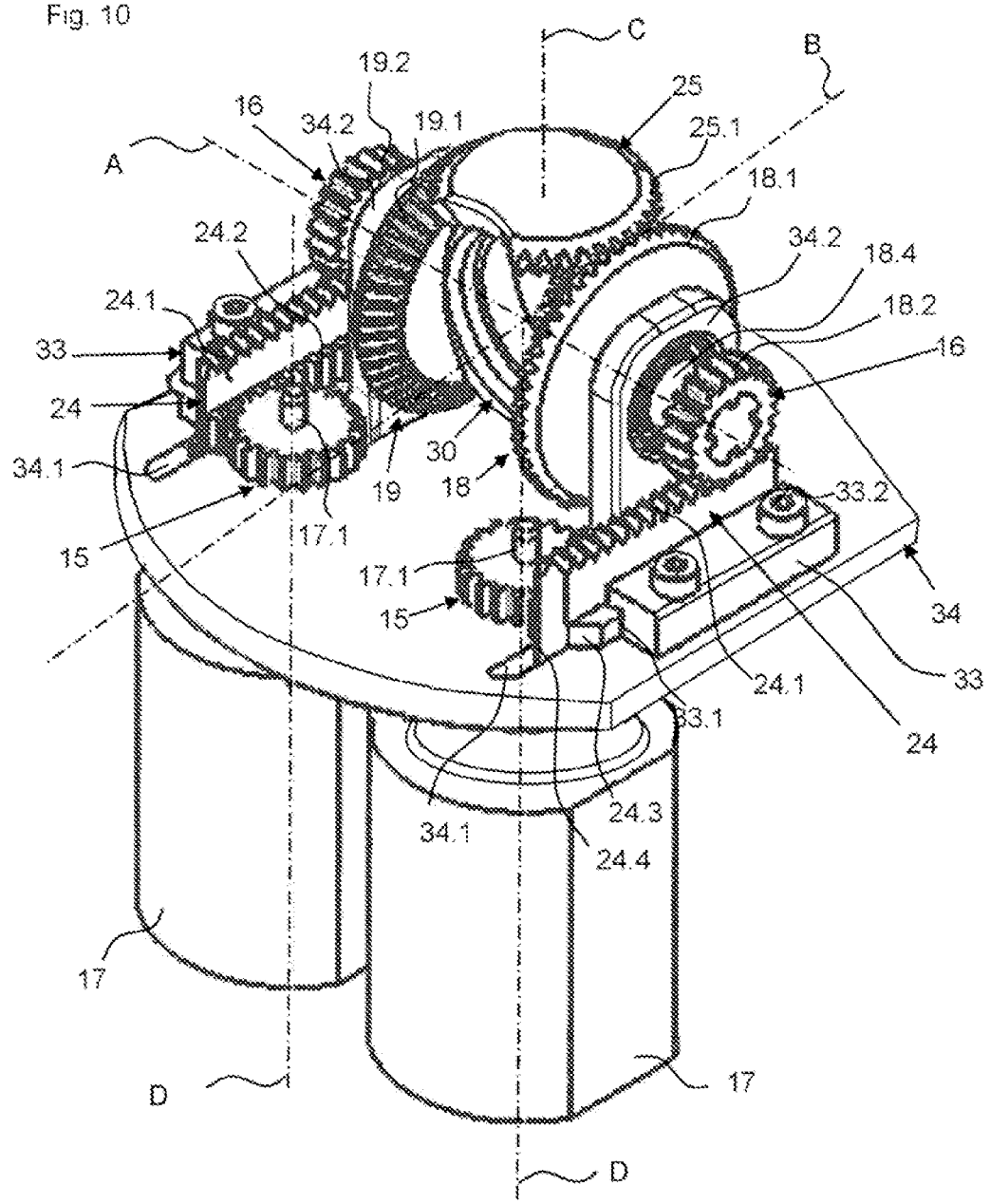
FIG. 10 shows a perspective detailed view of a motorized drive with a wobble plate steering gear as per a further embodiment according to the invention with a toothed rack gearing.

A further example of an alternative gearing of a steering gear 13 according to the disclosure is a toothed rack gearing, as depicted by way of example in FIG. 10. In this case, the steering ring unit made of the steering ring 30, the third gear wheel 25 connected therewith, and the drive wheels 18, 19 meshing with the latter is arranged on a platform 34. To this end, the platform 34 comprises, adjacent to the two drive wheels 18, 19, a respective bearing bracket 34.2 with a bearing eye for accommodating and mounting a output shaft 18.4 which is assigned to the respective drive wheel 18, 19 and runs along the common axis of rotation A. The output shafts 18.4, of which only the output shaft 18.4 of the front drive wheel 18 in the illustration is visible in FIG. 10 on account of the perspective, connect the respective drive wheel 18, 19 to a respective transmission pinion 16, the drive rim 18.2, 19.2 of which meshes with the end toothing 24.1 of a toothed rack 24. The latter is arranged in longitudinally movable fashion with a guide portion 24.4 in a guide groove 34.1, which is formed in the platform 34 in a manner perpendicular to the common axis of rotation A and parallel to the longitudinal axis B. The toothed rack 24 further comprises a lateral toothing 24.2 which meshes with a drive pinion 15 that is actuatable via the drive shaft 17.1 of the motor 17. The motors 17 are arranged on the side of the platform 34 facing away from the steering ring unit, wherein the drive shaft 17.1 (or a corresponding extension piece) extends through an opening (not visible in FIG. 10) in the platform 34 such that the drive axes D run perpendicular to the common axis of rotation A of the drive wheels 18, 19 and also perpendicular to the longitudinal axis B. To secure the longitudinal guide of the toothed rack 24, a guide block 33 is also arranged on the platform 34 adjacent to the guide groove 34.1 and fastened by fastening elements 33.2. On the side facing the toothed rack 24, the guide block 33 has a lateral guide groove 33.1, in which a guide rail 24.3 of the toothed rack 24 is guided, said guide rail being present on the side of the toothed rack 24 facing away from the lateral toothing 24.2.

Figure 11:
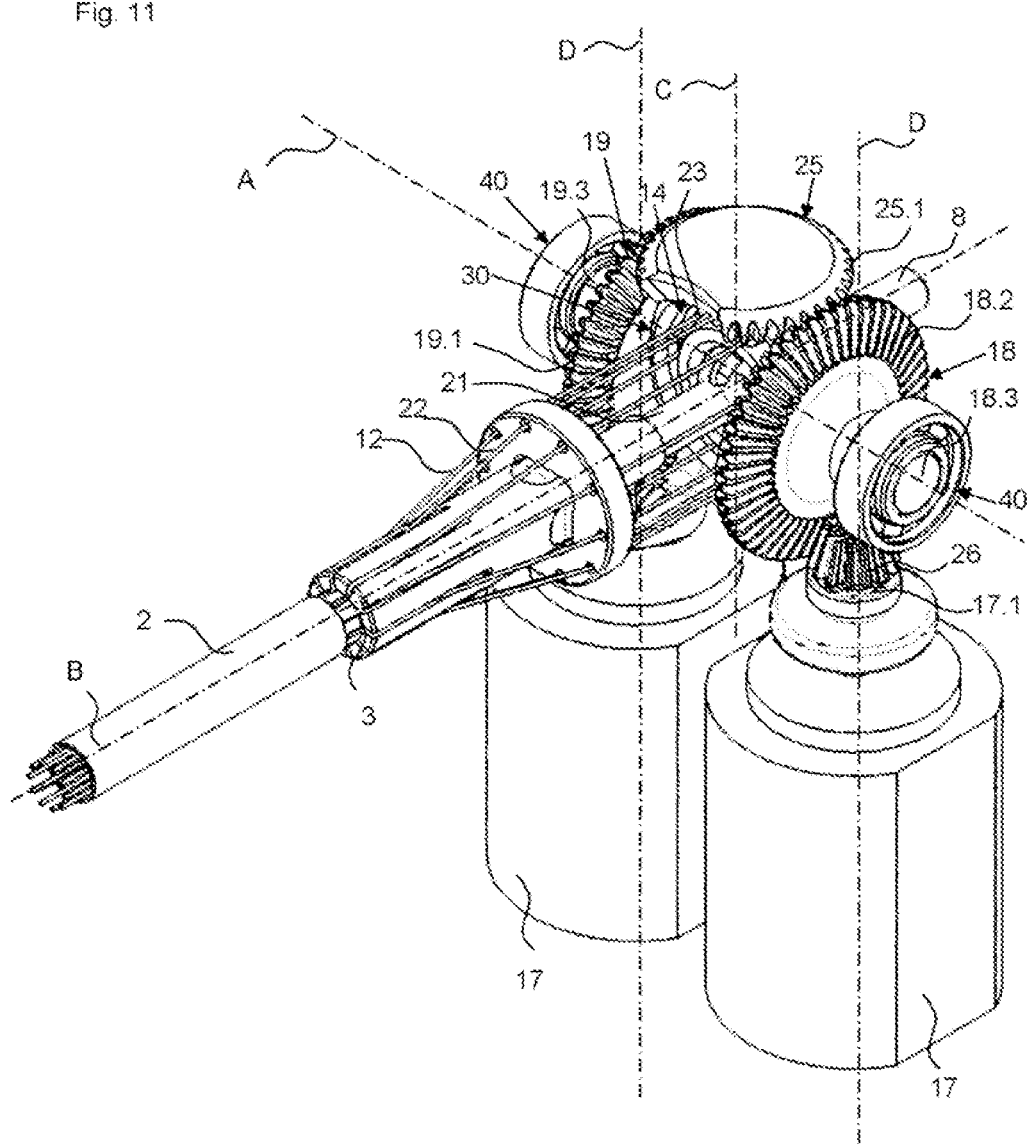
FIG. 11 shows a perspective detailed view of a motorized drive with a wobble plate steering gear as per a further embodiment according to the invention with a bevel gear gearing.

FIG. 11 elucidates a gearing with a drive bevel gear 26 for transmitting the adjustment movements from the motor 17 via the drive shaft 17.1 to the respective drive wheel 18, 19, which, as a double wheel, to this end comprises a second bevel gear rim 18.2, 19.2 on the side facing outward such that the drive axes D of the two drive shafts 17.1 run perpendicular to the common axis of rotation A of the two drive wheels 18, 19. To be able to arrange the drive axes D as close together as possible and compactly around the longitudinal axis B, the double wheel 18, 19 with the two bevel gear rims 18.1, 18.2, 19.1, 19.2 can be manufactured in one piece, wherein the number of teeth of the bevel gear rim 18.1, 19.1 for meshing with the third gear wheel 25 may be identical to the number of teeth of the second bevel gear rim 18.2, 19.2 and the teeth may be offset from one another by half a pitch such that the teeth as it were are pushed into one another and the thickness of the double wheel can be minimized. The drive wheels 18, 19 can be securely mounted in a housing (not depicted) via a bearing 40, with the result that their common axis of rotation A and axial position are defined. To this end, the drive wheels 18, 19 comprise a journal 18.3, 19.3, which can be mounted with the bearing 40 in a housing. As an alternative, the bearing can conversely provide for a journal on the housing, on which a bearing let into the drive wheel 18, 19 is seated (not depicted).

Figure 12:
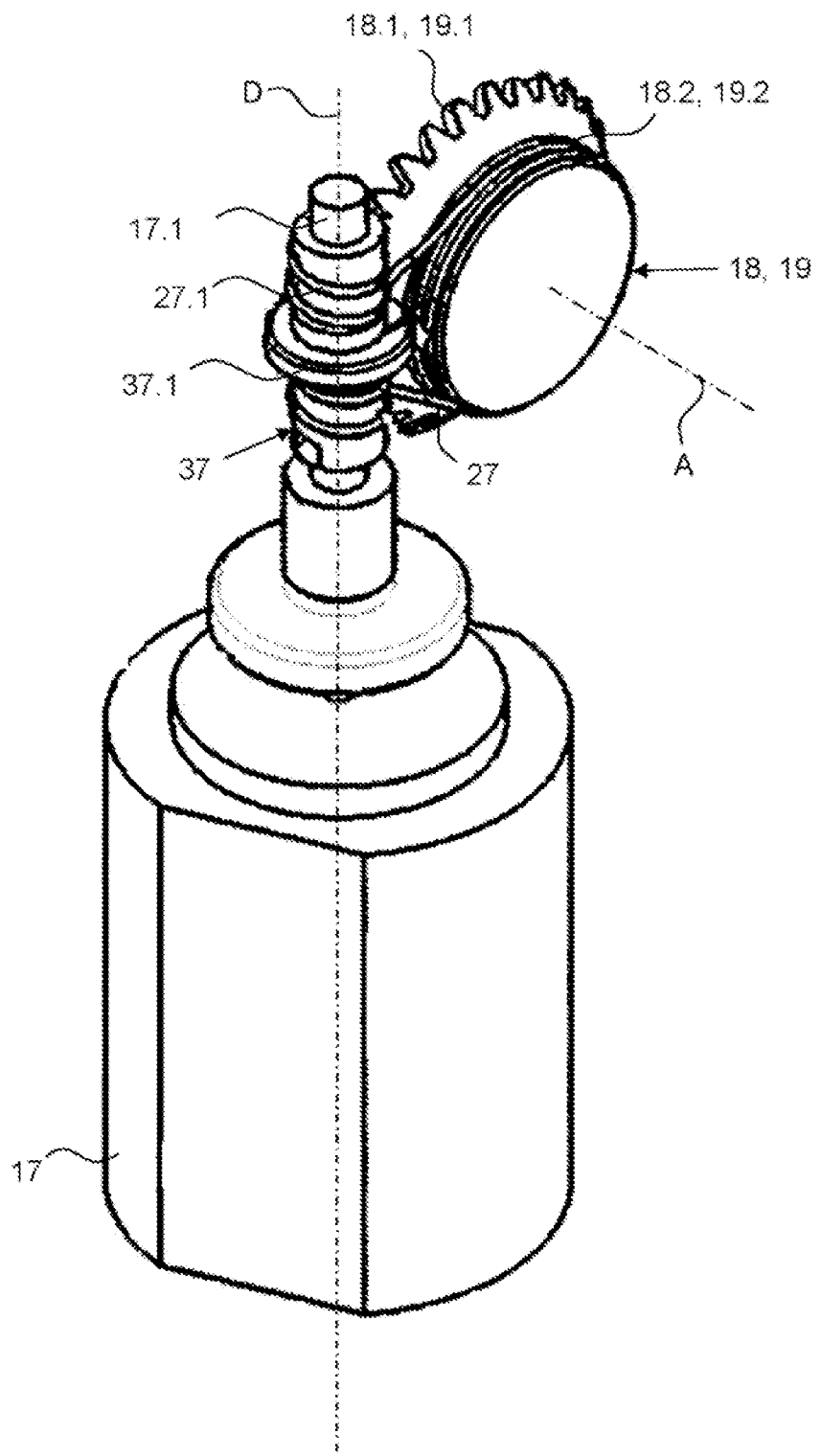
FIG. 12 shows a perspective detailed view of a motorized drive with a wobble plate steering gear as per a further embodiment according to the invention with a spindle gearing.

For the sake of simplicity. FIG. 12 only depicts one drive unit made of motor 17, drive shaft 17.1, and gearing for a drive wheel 18, 19. The structure of a steering gear 13 according to the disclosure equipped therewith and comprising a second such drive unit, the third gear wheel 25, the steering ring 30, and the engagement securing device is readily transferable from the remaining examples. In this case, the gearing comprises a spindle 37 on the drive axis 17.1 and a traction mechanism 27, which provides an operative connection between the spindle 37 and the drive rim 18.2, 19.2, embodied here as traction mechanism plate, of the drive wheel 18, 19 which in this case is embodied as a double wheel, wherein the bevel gear rim 18.1, 19.1 is formed axially adjacently to the drive rim 18.2, 19.2. In the embodiment as traction mechanism plate, a drive rim 18.2, 19.2 is understood in this context to mean a plate with at least one all-round groove for guiding the traction mechanism 27. The spindle 37 may also comprise a groove for guiding the traction mechanism 27, with the result that the traction mechanism 27, which may be a cable or belt, entwines the spindle 37 with a plurality of traction mechanism entwinements 27.1. Actuating the spindle 37 causes the traction mechanism 27 to be wound onto one end of the spindle 37 and unwound from the other end, whereby the traction mechanism 27 transfers the drive movement via the drive rim 18.2, 19.2 embodied as traction mechanism plate to the drive wheel 18, 19.

The traction mechanism 27 can be provided by a closed cable or a closed belt, which entwines the spindle 37 and the drive rim 18.2, 19.2. Alternatively, as shown in the example in FIG. 12, an open cable or belt with two ends can be used as traction mechanism 27, with each end being fastened to the ends of the spindle groove, which is delimited by a spindle nut 37.1, by way of sliding blocks (not visible), while the traction mechanism 27 entwines the drive rim 18.2, 19.2 embodied as a traction mechanism plate. Naturally, the spindle can alternatively be entwined by the traction mechanism while the traction mechanism ends are fastened by sliding blocks in the groove of the drive rim 18.2, 19.2 formed as traction mechanism plate. Further, there is also the option of using two traction mechanisms, wherein one respective traction mechanism end is fastened in the spindle groove and the other in the traction mechanism plate groove by way of sliding blocks.

In the example depicted in FIG. 12, the drive axis D runs perpendicular to the common axis of rotation A of the drive wheels 18, 19. However, due to the possibility of the traction mechanism deflection by the optional additional use of deflection rollers (not depicted), the position of the motors 17 can be chosen freely, with the result that the drive axis D can run in any desired orientation in relation to the common axis of rotation A.

Figure 13:
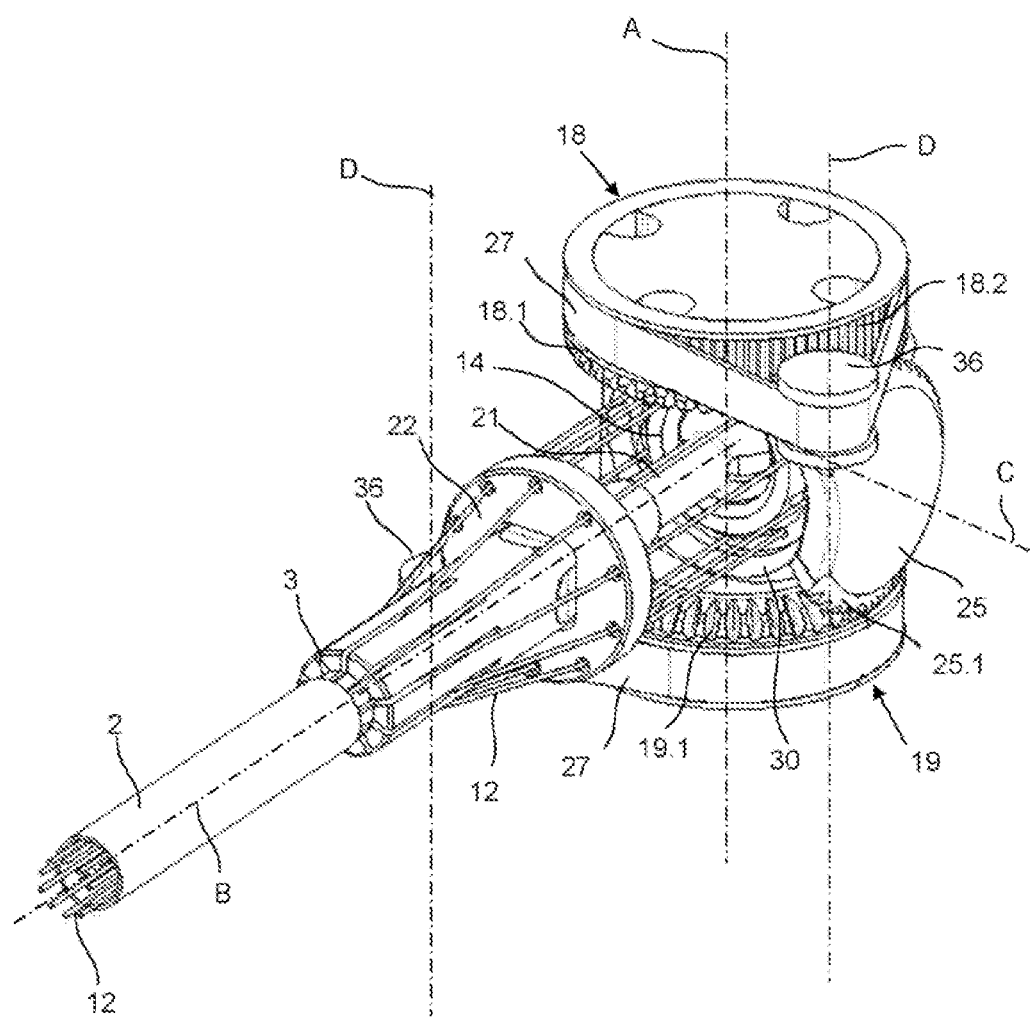
FIG. 13 shows a perspective detailed view of a motorized drive with a wobble plate steering gear as per a further embodiment according to the invention with a belt gearing.

FIG. 13 elucidates an example of a belt gearing as gearing, which combines features of the spur gear gearing from FIG. 8 and the spindle gearing from FIG. 12. In this case, the motors have not been depicted for reasons of better overview: however, it is self-evident that the depicted pulley 36, which corresponds to a pinion, is driven by a motor with a drive shaft located on a drive axis D. As a consequence of using traction mechanisms 27 for transmitting the adjustment movements to the drive wheels 18, 19, the drive rims 18.2, 19.2 of the drive wheels 18, 19 are likewise embodied as pulleys. In this way, an adjustment movement of the pulley 36 actuated by the motor can be transmitted to the drive wheels 18, 19 via the traction mechanisms 27. As further evident in FIG. 13 from the drive rim 18.2, which has a toothing, the belt 27 is embodied as a toothed belt in this example. Consequently, the pulley 36 also has a toothing, even if the latter is not evident in the illustration.

Naturally, belt gearings deviating from a toothed belt gearing are also usable, for example flat belts, round belts, V-belts, or ribbed V-belts, wherein the pulleys are formed with a circumferential profile corresponding to the drive belt. In a manner analogous to the example shown in FIG. 13 with the belt gearing, an embodiment with a chain gearing is also conceivable (not depicted in the drawings), in which chains are used as the traction mechanism 27 and, accordingly, the pulley 36 and the drive rims 18.2, 19.2 of the drive wheels 18, 19 are designed as sprockets. Not only is the positioning of the pulleys 36 and the drive axes D independent of one another and as desired on a circular trajectory around the drive wheels 18, 19 in both cases, but it can also be chosen at any desired distance from the drive wheels 18, 19 as a result of varying the length of the traction mechanism. However, since an installation space reduction is desirable, a positioning of the drive axes D close to the drive wheels 18, 19, and by preference also close to the longitudinal axis B, is preferable.

The examples described in the context of the figures should not be construed as limiting. Described details such as the embodiment variants of the drive wheels 18, 19 as double wheel or with different toothing portions, or the one-piece property of steering ring 30 and third gear wheel 25 can be combined in any desired manner, providing this is sensible.

An exemplary embodiment of the disclosure is depicted in the drawings. The drawings, the description, and the claims contain numerous features in combination. A person skilled in the art will advantageously also consider the features on an individual basis and combine them to form further advantageous combinations. The present disclosure provides a steering gear 13 for a surgical instrument 1, wherein the steering gear 13 is arrangeable at the proximal end 3 of a shaft 2, which defines a longitudinal axis B and comprises, at the distal end 5, a deflection mechanism 9 which is controllable by a spatially alignable wobble plate 14. In this case, the steering gear 13 comprises a first drive wheel 18 and a second drive wheel 19, each with an assigned motor 17, and the second drive wheel 19 is arranged offset by 180° from the first drive wheel 18 on an axis of rotation A common with the first drive wheel 18 and running perpendicular to the longitudinal axis B. The wobble plate 14 is mounted between the first drive wheel 18 and the second drive wheel 19 in a steering ring 30 connected to a third gear wheel 25 for conjoint rotation therewith, said third gear wheel meshing with the first drive wheel 18 and the second drive wheel 19 and being rotatable about an axis of rotation C which runs perpendicular to the common axis of rotation A of the drive wheels 18, 19. In this case, the steering gear 13 comprises a support yoke 20 which is rotatably mounted about the common axis of rotation A of the drive wheels 18, 19, wherein the steering ring 30 is mounted in the support yoke 20 in a manner rotatable about the axis of rotation C of the third gear wheel 25 such that the meshing of the third gear wheel 25 with the drive wheels 18, 19 is ensured. Furthermore, a surgical instrument 1 is disclosed which comprises such a steering gear 13.

The invention claimed is:

1. A steering gear for a surgical instrument, wherein the steering gear is arrangeable at the proximal end of a shaft, which defines a longitudinal axis and includes, at the distal end of the shaft, a deflection mechanism which is controllable by a spatially alignable wobble plate, wherein the steering gear comprises:
   a first drive wheel and a second drive wheel, each with an assigned motor, and the second drive wheel is arranged offset by 180° from the first drive wheel on an axis of rotation common with the first drive wheel and running perpendicular to the longitudinal axis, and
   the wobble plate is mounted between the first drive wheel and the second drive wheel in a steering ring connected to a third gear wheel for conjoint rotation therewith, said third gear wheel for meshing with the first drive wheel and the second drive wheel and being rotatable about an axis of rotation which runs perpendicular to the common axis of rotation of the drive wheels; and
   wherein the steering gear further includes a support yoke which is rotatably mounted about the common axis of rotation of the drive wheels, wherein the steering ring is mounted in the support yoke in a manner rotatable about the axis of rotation of the third gear wheel such that the meshing of the third gear wheel with the drive wheels is ensured.

2. The steering gear as set forth in claim 1, wherein the support yoke has a u-shaped embodiment with a base and two limbs, wherein the base has a receptacle opening in which a steering ring connector formed on the steering ring is rotatably mounted, and wherein each limb has a bearing eye by means of which the support yoke is mounted in a manner rotatable about the common axis of rotation of the drive wheels (18, 19), preferably in a manner rotatable on a journal of the drive wheels.

3. The steering gear as set forth in claim 2, wherein the steering ring connector has a cylindrical shape and is mounted by way of a steering ring bearing in a cylindrical portion of the receptacle opening.

4. The steering gear as set forth in claim 2, wherein the third gear wheel is present on the steering ring diametrically to the base (20.3) of the support yoke, or
   the third gear wheel and the base of the support yoke are disposed on the same side of the steering ring.

5. The steering gear as set forth in claim 4, wherein the steering gear, in which the third gear wheel is disposed on the steering ring diametrically to the base (20.3) of the support yoke, includes a fastening element which provides an operative connection between the support yoke and the steering ring and which is designed to pull the steering ring with the connected third gear wheel in the direction of the base of the support yoke in order to ensure the meshing of the gear wheel with the drive wheels.

6. The steering gear as set forth in claim 5, wherein the fastening element of the steering gear with the cylindrically shaped steering gear connector, which is mounted by way of the steering ring bearing in the cylindrical portion of the receptacle opening (20.1), is a screw which is screwed into the steering ring connector (30.1) in the axis of rotation of the third gear wheel.

7. The steering gear as set forth in claim 1, wherein the steering ring is formed in one piece with the third gear wheel; and/or
the drive wheels each comprise at least one bevel gear rim portion for meshing with at least one bevel gear rim portion of the third gear wheel, wherein the bevel gear rim portions of the drive wheels and the bevel gear rim portion of the third gear wheel are formed as bevel rims over the entire circumference or extend over a first pre-determinable circumferential portion of the respective drive wheel and over pre-determinable circumferential portions of the third gear wheel, which provide the meshing of the drive wheels with the third gear wheel over a pre-determinable range of motion of the steering ring.

8. The steering gear as set forth in claim 1, wherein each drive wheel is actuatable by the assigned motor by way of a respective drive shaft, the drive axis of which corresponds to the common axis of rotation of the two drive wheels;
or
each drive wheel is actuatable by the assigned motor by way of a respective drive shaft and a respective gearing, wherein the drive axis of the drive shaft does not correspond to the common axis of rotation of the two drive wheels.

9. The steering gear as set forth in claim 8, wherein the gearing is one of:
a pinion, and the drive wheels each comprise at least one drive rim portion for meshing with the respective pinion, wherein the drive axes of both drive shafts run parallel to the common axis of rotation of the two drive wheels; and
a worm shaft, and the drive wheels each comprise at least one drive rim portion for meshing with the respective worm shaft, wherein the drive axes run perpendicular to the common axis of rotation of the two drive wheels; and
a drive bevel gear, and the drive wheels each comprise at least one drive rim portion for meshing with the respective drive bevel gear, wherein the drive axes of both drive shafts run perpendicular to the common axis of rotation of the two drive wheels.

10. The steering gear as set forth in claim 9, wherein the drive wheels are designed as double wheels, wherein the respective bevel gear rim portion is arranged axially adjacent to the drive rim portion and the bevel gear rim portions of the two double wheels face one another for the purpose of meshing with the third gear wheel; or
the respective drive rim portion extends over a second pre-determinable circumferential portion of the respective drive wheel, which provides the meshing of the drive wheels with the respective pinion or the respective worm shaft or the respective drive bevel gear over a pre-determinable range of motion of the steering ring, wherein the drive rim portion has no overlap with the respective bevel gear rim portion.

11. The steering gear as set forth in claim 8, wherein the gearing comprises a drive pinion, a toothed rack having an end toothing and a lateral toothing, and a transmission pinion, wherein the drive pinion is actuatable by the respectively assigned motor by way of the drive shaft and meshes with the lateral toothing of the toothed rack; and
the transmission pinion meshes with the end toothing of the toothed rack and is connected via an output shaft to the drive wheel; and
wherein the drive axes run perpendicular to the common axis of rotation of the two drive wheels.

12. The steering gear as set forth in claim 8, wherein the gearing comprises a spindle and a traction mechanism, and the drive wheels are designed as double wheels, wherein the drive rim is designed as a traction mechanism plate, and wherein
the traction mechanism provides an operative connection between the spindle, which is arranged on the drive shaft, and the drive rim designed as a traction mechanism plate, wherein an orientation of the drive axes can be chosen as desired in relation to the common axis of rotation of the two drive wheels.

13. The steering gear as set forth in claim 8, wherein the gearing comprises a pulley and a traction mechanism, and the drive wheels are designed as double wheels, wherein the drive rim is designed as a pulley, and wherein
the traction mechanism provides an operative connection between the pulley, which is arranged on the drive shaft, and the drive rim designed as a traction mechanism plate, wherein the drive axes run parallel to the common axis of rotation of the two drive wheels.

14. A surgical instrument including a shaft, a manipulation unit arranged at the proximal end of the shaft, and a tool arranged at the distal end of the shaft with a tool tip which can be deflected by means of a distal deflection mechanism and which can be controlled by a wobble plate that can be spatially oriented by means of two drives, wherein
the surgical instrument has the steering gear as set forth in claim 1 for the spatial orientation of the wobble plate.

15. The surgical instrument as set forth in claim 14, wherein the wobble plate is gimbal-coupled to a main shaft running coaxially with a longitudinal axis of the shaft; or
a manipulation element is axially displaceably mounted in the shaft and is operatively connected on the proximal side to the manipulation unit; or
the distal deflection mechanism of the tool tip able to be deflected consists of pivot members which are arranged at the distal end of the shaft and connected to the steering gear by way of steering wires running in the longitudinal direction of the shaft, and wherein a fan plate is arranged on the main shaft preferably on the distal side upstream of the spatially adjustable plate, and increases the radial distance of the steering wires from the longitudinal axis of the shaft.

* * * * *